US012617996B2

(12) United States Patent
Zheng et al.

(10) Patent No.: US 12,617,996 B2
(45) Date of Patent: May 5, 2026

(54) HIGHLY THERMALLY CONDUCTIVE HEAT STORAGE MATERIAL, PREPARATION METHOD THEREFOR, AND APPLICATION THEREOF, AND COMPOSITION FOR PREPARING HIGHLY THERMALLY CONDUCTIVE HEAT STORAGE MATERIAL AND APPLICATION THEREOF

(71) Applicants: CHINA ENERGY INVESTMENT CORPORATION LIMITED, Beijing (CN); NATIONAL INSTITUTE OF CLEAN-AND-LOW-CARBON ENERGY, Beijing (CN)

(72) Inventors: Dongfang Zheng, Beijing (CN); Wenbin Liang, Beijing (CN); Chang Wei, Beijing (CN); Junqing Liu, Beijing (CN); Ying Sheng, Beijing (CN); Chunting Duan, Beijing (CN); Jianming Wei, Beijing (CN); Guanghui Gao, Beijing (CN); Chengyu Wen, Beijing (CN)

(73) Assignees: CHINA ENERGY INVESTMENT CORPORATION LIMITED, Beijing (CN); NATIONAL INSTITUTE OF CLEAN-AND-LOW-CARBON ENERGY, Beijing (CN)

( * ) Notice: Subject to any disclaimer, the term of this patent is extended or adjusted under 35 U.S.C. 154(b) by 333 days.

(21) Appl. No.: 18/551,854

(22) PCT Filed: Nov. 26, 2021

(86) PCT No.: PCT/CN2021/133550
§ 371 (c)(1),
(2) Date: Sep. 21, 2023

(87) PCT Pub. No.: WO2022/205970
PCT Pub. Date: Oct. 6, 2022

(65) Prior Publication Data
US 2024/0174909 A1 May 30, 2024

(30) Foreign Application Priority Data
Mar. 31, 2021 (CN) .......................... 202110351896.8

(51) Int. Cl.
*C09K 5/14* (2006.01)
*C04B 35/52* (2006.01)
*C04B 35/645* (2006.01)
*F28D 20/00* (2006.01)

(52) U.S. Cl.
CPC .............. *C09K 5/14* (2013.01); *C04B 35/522* (2013.01); *C04B 35/645* (2013.01); *F28D 20/0056* (2013.01); *C04B 2235/425* (2013.01); *C04B 2235/604* (2013.01); *C04B 2235/656* (2013.01);

(Continued)

(58) Field of Classification Search
CPC ................ C04B 35/522; C04B 35/645; C04B 2235/425; C04B 2235/604; C04B 2235/656; C04B 2235/786; C04B 2235/9607; C01B 32/05; C08K 3/04; C09K 5/14; F28D 20/0056; Y02E 60/14
See application file for complete search history.

(56) References Cited

U.S. PATENT DOCUMENTS 6,673,328 B1 * 1/2004 Klett ..................... F28F 13/187
423/448
2003/0003289 A1 1/2003 Py et al.

FOREIGN PATENT DOCUMENTS

CN 101708838 A 5/2010
CN 102575144 A 7/2012
CN 105859291 A 8/2016
(Continued)

OTHER PUBLICATIONS

Liu et al., "Graphite blocks with high thermal conductivity derived from natural graphite flake" Carbon 46 (2008) 414-421.
Extended European Search Report of application No. 21934606.1 dated Feb. 18, 2025.
Paper titled "Graphite blocks with high thermal conductivity derived from natural graphite flake".
Liu et al., Preparation of Carbon/Ceramic Composite with High Thermal Conductivity, 1 Key Laboratory of Carbon Materials, Institute of Coal Chemistry, Chinese Academy of Sciences, 2007, pp. 1-7.

(Continued)

*Primary Examiner* — Anthony J Green
(74) *Attorney, Agent, or Firm* — Calfee, Halter & Griswold LLP

(57) ABSTRACT

The present invention relates to the fields of heat storage and thermally conductive materials, and discloses a highly thermally conductive heat storage material, a preparation method therefor, and the application thereof, and a composition for preparing a highly thermally conductive heat storage material and the application thereof. The highly thermally conductive heat storage material comprises 11-41 wt % of a carbonaceous part and 59-89 wt % of a graphitic part; for the carbonaceous part, $L_c > 18$ nm, $L_a > 35$ nm, $d_{002} < 0.3388$ nm, and the degree of graphitization is 60% to 95%; for the graphitic part, $L_c > 50$ nm; $L_a > 80$ nm; $d_{002} < 0.3358$ nm, and the degree of graphitization is 95% to 100%. The highly thermally conductive heat storage material comprises a carbonaceous part with a specific structure and a graphitic part with a specific structure, and the heat storage material obtained thereby possesses high thermal conductivity and high compressive strength. Meanwhile, the preparation process of the highly thermally conductive heat storage material is simple and cost-effective.

17 Claims, 1 Drawing Sheet

(52) U.S. Cl.
    CPC .................. *C04B 2235/786* (2013.01); *C04B 2235/9607* (2013.01)

(56)                    References Cited

FOREIGN PATENT DOCUMENTS

| | | | |
|---|---|---|---|
| CN | 107522488 | A | 12/2017 |
| CN | 110071301 | A | 7/2019 |
| CN | 110550955 | A | 12/2019 |
| CN | 112299848 | A | 2/2021 |
| EP | 3674371 | A1 | 7/2020 |
| JP | 2011037919 | A * | 2/2011 |

OTHER PUBLICATIONS

English translation of International Search Report from PCT/CN2021/133550 dated Jan. 27, 2022 (3 pages).

* cited by examiner

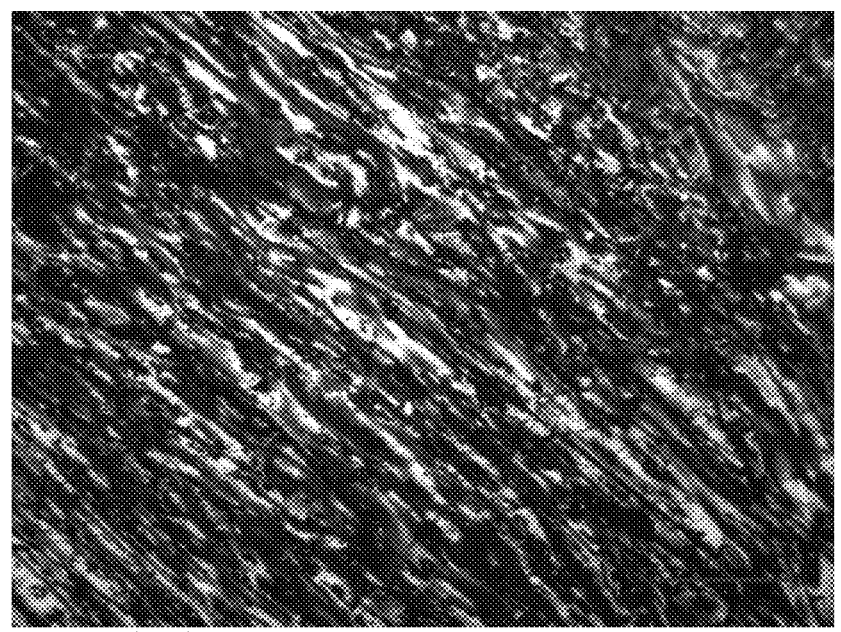

HIGHLY THERMALLY CONDUCTIVE HEAT STORAGE MATERIAL, PREPARATION METHOD THEREFOR, AND APPLICATION THEREOF, AND COMPOSITION FOR PREPARING HIGHLY THERMALLY CONDUCTIVE HEAT STORAGE MATERIAL AND APPLICATION THEREOF

CROSS-REFERENCE TO RELATED APPLICATIONS

The present application is the U.S. National Stage Application under 35 U.S.C. § 371 of International Patent Application No. PCT/CN2021/133550, filed on Nov. 26, 2021, which claims the benefit of Chinese patent application 202110351896.8, filed on Mar. 31, 2021, the entire disclosures of which are incorporated herein by reference.

TECHNICAL FIELD

The present invention relates to the fields of heat storage and thermally conductive materials, in particular to a highly thermally conductive heat storage material, preparation method therefor, and application thereof, and a composition for preparing highly thermally conductive heat storage material and application thereof.

BACKGROUND

Heat storage devices play an important role in solar thermal power, electric peak management, clean energy heating, waste heat utilization, etc. In the background of energy shortage, it is particularly important to be able to quickly and effectively utilize the heat from waste heat, valley electricity and clean energy. The high thermal conductivity of heat storage materials is conducive to achieving the goal of fast heat storage and release speed and high temperature uniformity, and the high temperature resistance of the material can achieve the goals of high heat storage temperature and high heat storage density.

CN110550955A discloses an ultra-high thermal conductivity and high strength graphite block material and a preparation method thereof. The graphite block material is obtained by using a high-purity natural graphite powder as the heat transfer enhancer, a high-quality mesophase pitch as the binder, and a silicon-titanium-molybdenum ternary component as the catalytic graphitization additive, and using hot-pressing sintering at high temperature. The graphite block material, with a thermal conductivity of greater than 600 W/mK and a bending strength of greater than 50 MPa, is expected to play a significant role in the fields of high heat flux and diverse operating conditions such as thermal protection for aerospace vehicles, first wall of nuclear fusion, and high-power density electronic devices.

Preparation of carbon/ceramic composite material with high thermal conductivity and the performance study thereof, published by Zhanjun Liu, etc., in the supplement of 2007 of Material Engineering, discloses that series of carbon/ceramic composite materials were prepared by using the natural flake graphite powder as the skeletal material carbon, the mesophase pitch as the binder and Si and Ti as additives, and using a hot press process. When the hot press temperature is 2700° C., the thermal conductivity of the material in the direction parallel to the graphite layer is 654 W/m·K, the thermal diffusion coefficient is 413 mm²/s, the bending strength is 34.5 MPa and the compressive strength is 31.5 MPa. In the above-mentioned composite materials, the Japanese naphthalene series AR mesophase pitch is used as the binder, which results in a high cost, and one-step hot press molding is adopted, which demands a high molding temperature, high process requirements, and a high energy consumption.

SUMMARY

The purpose of the present invention is to overcome the problems of high process requirements and high cost in the prior art, and provide a highly thermally conductive heat storage material, a preparation method therefor, and the application thereof, and a composition for preparing a highly thermally conductive heat storage material and the application thereof. The highly thermally conductive heat storage material comprises a carbonaceous part with a specific structure and a graphitic part with a specific structure, and thus a heat storage material with high thermal conductivity and compressive strength is obtained. Meanwhile, the preparation process of the highly thermally conductive heat storage material is simple and cost-effective.

In order to achieve the above purposes, the first aspect of the present invention provides a highly thermally conductive heat storage material, characterized in that, the highly thermally conductive heat storage material comprises a carbonaceous part and a graphitic part;

wherein, based on the total weight of the highly thermally conductive heat storage material, the content of the carbonaceous part is 11 wt % to 41 wt %, and the content of the graphitic part is 59 wt % to 89 wt %;

the microcrystal size Lc in the c-axis direction of the carbonaceous part obtained by XRD is >18 nm; the microcrystal size $L_a$ in the a-axis direction is >35 nm; the interlayer spacing $d_{002}$ of the crystal plane (002) is <0.3388 nm; and the degree of graphitization is 60% to 95%;

the microcrystal size Lc in the c-axis direction of the graphitic part obtained by XRD is >50 nm; the microcrystal size $L_a$ in the a-axis direction is >80 nm; the interlayer spacing $d_{002}$ of the crystal plane (002) is <0.3358 nm; and the degree of graphitization is 95% to 100%.

The second aspect of the present invention provides a composition for preparing a highly thermally conductive heat storage material, characterized in that, the composition comprises graphite and mesophase pitch;

based on the total weight of the highly thermally conductive heat storage material composition, the content of the graphite is 50 wt % to 85 wt %, and the content of the mesophase pitch is 15 wt % to 50 wt %;

the microcrystal size Lc in the c-axis direction, the microcrystal size $L_a$ in the a-axis direction and the interlayer spacing $d_{002}$ of the crystal plane (002) of the mesophase pitch obtained by XRD meet the following conditions:

$$L_a > 12 \text{ nm}, L_c > 2 \text{ nm}, d_{002} < 0.3580 \text{ nm};$$

the mesophase content of the mesophase pitch is 30 wt % to 100 wt %, and the softening point is 300° C. to 400° C.;

the microcrystal size Lc in the c-axis direction, the microcrystal size $L_a$ in the a-axis direction and the interlayer spacing $d_{002}$ of the crystal plane (002) of the graphite obtained by XRD meet the following conditions:

$$L_c > 50 \text{ nm}, L_a > 80 \text{ nm}, d_{002} < 0.3358 \text{ nm}.$$

The third aspect of the present invention provides a preparation method of a highly thermally conductive heat storage material, wherein, the preparation method comprises the following steps:

(1) subjecting the components in a highly thermally conductive heat storage material composition to uniform mixing to obtain a highly thermally conductive heat storage material premix;

(2) subjecting the premix to pressing at normal temperature for pre-molding to obtain a pre-molded block;

(3) subjecting the pre-molded block to hot press molding to obtain a molded sample;

(4) subjecting the molded sample to heat treatment in an inert atmosphere to obtain the highly thermally conductive heat storage material;

wherein, the composition comprises graphite and mesophase pitch;

based on the total weight of the highly thermally conductive heat storage material composition, the content of the graphite is 50 wt % to 85 wt %, and the content of the mesophase pitch is 15 wt % to 50 wt %;

the microcrystal size $L_c$ in the c-axis direction, the microcrystal size $L_a$ in the a-axis direction and the interlayer spacing $d_{002}$ of the crystal plane (002) of the mesophase pitch obtained by XRD meet the following conditions:

$$L_a>12 \text{ nm}, L_c>2 \text{ nm}, d_{002}<0.3580 \text{ nm};$$

the mesophase content of the mesophase pitch is 30 wt % to 100 wt %, and the softening point is 300° C. to 400° C.;

the microcrystal size $L_c$ in the c-axis direction, the microcrystal size $L_a$ in the a-axis direction and the interlayer spacing $d_{002}$ of the crystal plane (002) of the graphite obtained by XRD meet the following conditions:

$$L_c>50 \text{ nm}, L_a>80 \text{ nm}, d_{002}<0.3358 \text{ nm}.$$

The fourth aspect of the present invention provides a highly thermally conductive heat storage material prepared by the preparation method mentioned above.

The fifth aspect of the present invention provides the application of the highly thermally conductive heat storage material mentioned above or the composition for preparing a highly thermally conductive heat storage material mentioned above in the field of thermal storage and/or the field of heat transfer.

Through the above-mentioned technical solution, the highly thermally conductive heat storage material composition, the highly thermally conductive heat storage material, the preparation method therefor and the application thereof provided by the present invention can obtain the following beneficial effects:

The highly thermally conductive heat storage material provided by the present invention comprises a carbonaceous part with a specific structure and a graphitic part with a specific structure, and thus a heat storage material with high thermal conductivity and compressive strength is obtained.

The highly thermally conductive heat storage material composition provided by the present invention comprises specific graphite and mesophase pitch, which can significantly improve the thermal conductivity of the heat storage material.

In the preparation method of a highly thermally conductive heat storage material provided by the present invention, pre-molding at normal temperature allows the graphite to be pre-pressed into a layered stack with a high orientation degree and be more compact, which is conducive to improving the thermal conductivity and the compressive strength;

furthermore, the molded sample formed by hot press molding can be subjected to heat treatment in batches, which can significantly reduce the process cost.

DESCRIPTION OF THE DRAWINGS

FIG. 1 is a polarized optical microscope photo of the mesophase pitch used in example 1.

EMBODIMENTS

The terminals and any values of the ranges disclosed herein are not limited to the precise ranges or values, such ranges or values shall be understood as comprising the values adjacent to the ranges or values. As for numerical ranges, the endpoint values of the various ranges, the endpoint values and the individual point values of the various ranges, and the individual point values may be combined with one another to produce one or more new numerical ranges, which should be deemed to have been specifically disclosed herein.

The first aspect of the present invention provides a highly thermally conductive heat storage material, characterized in that, the highly thermally conductive heat storage material comprises a carbonaceous part and a graphitic part;

wherein, based on the total weight of the highly thermally conductive heat storage material, the content of the carbonaceous part is 11 wt % to 41 wt %, and the content of the graphitic part is 59 wt % to 89 wt %;

the microcrystal size $L_c$ in the c-axis direction of the carbonaceous part obtained by XRD is >18 nm; the microcrystal size $L_a$ in the a-axis direction is >35 nm; the interlayer spacing $d_{002}$ of the crystal plane (002) is <0.3388 nm; and the degree of graphitization is 60% to 95%;

the microcrystal size $L_c$ in the c-axis direction of the graphitic part obtained by XRD is >50 nm; the microcrystal size $L_a$ in the a-axis direction is >80 nm; the interlayer spacing $d_{002}$ of the crystal plane (002) is <0.3358 nm; and the degree of graphitization is 95% to 100%.

In the present invention, the highly thermally conductive heat storage material comprises a carbonaceous part and a graphitic part with different degrees of graphitization, and the carbonaceous part and the graphitic part possess specific microstructures, thereby, resulting in a high graphitization degree of the highly thermally conductive heat storage material, which leads to a high thermal conductivity.

Further, in the present invention, when the contents of the carbonaceous part and the graphitic part in the highly thermally conductive heat storage material are within the above ranges, the heat storage material will have a high thermal conductivity.

In the present invention, the degrees of graphitization of the carbonaceous part and the graphitic part are calculated through the interlayer spacing $d_{002}$ of the crystal plane (002) obtained by XRD analysis.

In the present invention, the calculation method of the degree of graphitization $\lambda$ is: $\lambda=(0.344-d_{002})\times100\%/(0.344-0.3354)$.

In the present invention, the contents of the carbonaceous part and the graphitic part in the highly thermally conductive heat storage material are calculated by the carbonization yield of the mesophase pitch part.

The specific calculation method is:

for example, the content of the mesophase pitch in the premix is A, the heat treatment yield of the mesophase pitch is P.

The content of the carbonaceous part is M:

$$M = A \times P / [A \times P + (1-A)]$$

the content of the graphitic part is N:

$$N = 1-M.$$

In the present invention, when the conditions of pressing at normal temperature for molding, hot press molding and heat treatment are the same, by treating the mesophase pitch separately, the heat treatment yield P of the mesophase pitch can be obtained.

Further, based on the total weight of the highly thermally conductive heat storage material, the content of the carbonaceous part is 19 wt % to 32 wt %, and the content of the graphitic part is 68 wt % to 81 wt %;

According to the present invention, for the highly thermally conductive heat storage material, the bulk density is 1.9 $g/cm^3$ to 2.18 $g/cm^3$, the thermal conductivity is 500 W/mk to 800 W/mk, the compressive strength is 29 MPa to 48 MPa, and the ratio of the thermal conductivity to the compressive strength is 12 W/(m·k·MPa) to 25 W/(m·k·MPa).

In the present invention, the bulk density of the highly thermally conductive heat storage material is determined according to GB/T 24528-2009(Carbon materials-Determination method of the bulk density); the thermal conductivity of the highly thermally conductive heat storage material is determined according to ASTM E1461 method; and the compressive strength of the highly thermally conductive heat storage material is determined according to GBT1431-2019 method.

The second aspect of the present invention provides a composition for preparing a highly thermally conductive heat storage material, characterized in that, the composition comprises graphite and mesophase pitch;

based on the total weight of the highly thermally conductive heat storage material composition, the content of the graphite is 50 wt % to 85 wt %, and the content of the mesophase pitch is 15 wt % to 50 wt %;

the microcrystal size $L_c$ in the c-axis direction, the microcrystal size $L_a$ in the a-axis direction and the interlayer spacing $d_{002}$ of the crystal plane (002) of the mesophase pitch obtained by XRD meet the following conditions:

$$L_a > 12 \text{ nm}, L_c > 2 \text{ nm}, d_{002} < 0.3580 \text{ nm};$$

the mesophase content of the mesophase pitch is 30 wt % to 100 wt %, and the softening point is 300° C. to 400° C.;

the microcrystal size $L_c$ in the c-axis direction, the microcrystal size $L_a$ in the a-axis direction and the interlayer spacing $d_{002}$ of the crystal plane (002) of the graphite obtained by XRD meet the following conditions:

$$L_c > 50 \text{ nm}, L_a > 80 \text{ nm}, d_{002} < 0.3358 \text{ nm}.$$

In the present invention, the highly thermally conductive heat storage material composition comprises a special graphite and a mesophase pitch with a specific microstructure, by using the composition obtained therefrom to prepare a highly thermally conductive heat storage material, not only a heat storage material with high thermal conductivity can be obtained, but also a highly thermally conductive heat storage material with a character of high compressive strength can be obtained.

In the present invention, the mesophase content of the mesophase pitch is determined by GBT 38396-2019 Pitch products of coal carbonization-Determination of mesophase content-Microscopical analysis by reflected light; and the softening point of the mesophase pitch is determined by GBT4507-2014 Standard test method for softening point of bitumen-Ring-and-ball apparatus.

Furthermore, when the microcrystal size $L_c$ in the c-axis direction, the microcrystal size $L_a$ in the a-axis direction and the interlayer spacing $d_{002}$ of the crystal plane (002) of the graphite obtained by XRD meet the following conditions: $L_c > 60$ nm, $L_a > 100$ nm, $d_{002} < 0.3358$ nm, the highly thermally conductive heat storage material prepared from the composition obtained possesses more excellent comprehensive performances.

Furthermore, when the microcrystal size $L_c$ in the c-axis direction, the microcrystal size $L_a$ in the a-axis direction and the interlayer spacing $d_{002}$ of the crystal plane (002) of the mesophase pitch obtained by XRD meet the following conditions: $L_c > 30$ nm, $L_a > 13$ nm, $d_{002} < 0.352$ nm, the highly thermally conductive heat storage material prepared from the composition obtained possesses more excellent comprehensive performances.

Furthermore, the mesophase content of the mesophase pitch is 80 wt % to 100 wt %, and the softening point of the mesophase pitch is 350° C. to 390° C.

According to the present invention, the graphite is selected from at least one of natural flake graphite, artificial graphite and spherical graphite.

According to the present invention, the carbon content of the graphite is >95 wt %. In the present invention, the graphite with a carbon content of >95 wt % is used as the raw material of the highly thermally conductive heat storage material composition, which can significantly improve the thermal conductivity performance of the highly thermally conductive heat storage material prepared from the composition.

In the present invention, the carbon content of the graphite is determined by GBT3521-2008 Method for chemical analysis of graphite.

Furthermore, the carbon content of the graphite is 96 wt % to 99.9 wt %, preferably >98 wt %.

According to the present invention, preferably, based on the total weight of the highly thermally conductive heat storage material composition, the content of the graphite is 60 wt % to 75 wt %, and the content of the mesophase pitch is 25 wt % to 40 wt %. The comprehensive performance of the highly thermally conductive heat storage material prepared by the composition is more excellent.

In the present invention, the above-mentioned highly thermally conductive heat storage material composition can be made into highly thermally conductive heat storage materials by conventional methods in the art. As long as the highly thermally conductive heat storage material composition comprises specific components and ratios described in the present invention, a highly thermally conductive heat storage material with the advantages of high thermal conductivity and high compressive strength can be obtained. And in order to further improve the comprehensive performance of the highly thermally conductive heat storage material, preferably, the present invention provides a preparation method of a highly thermally conductive heat storage material, wherein, the preparation method comprises the following steps:

(1) subjecting the components in a highly thermally conductive heat storage material composition to uniform mixing to obtain a highly thermally conductive heat storage material premix;

(2) subjecting the premix to pressing at normal temperature for pre-molding to obtain a pre-molded block;

(3) subjecting the pre-molded block to hot press molding to obtain a molded sample;

(4) subjecting the molded sample to heat treatment in an inert atmosphere to obtain the highly thermally conductive heat storage material;

wherein, the composition comprises graphite and mesophase pitch;

based on the total weight of the highly thermally conductive heat storage material composition, the content of the graphite is 50 wt % to 85 wt %, and the content of the mesophase pitch is 15 wt % to 50 wt %;

the microcrystal size $L_c$ in the c-axis direction, the microcrystal size $L_a$ in the a-axis direction and the interlayer spacing $d_{002}$ of the crystal plane (002) of the mesophase pitch obtained by XRD meet the following conditions:

$$L_c > 2 \text{ nm}, L_a > 12 \text{ nm}, d_{002} < 0.3580 \text{ nm};$$

the mesophase content of the mesophase pitch is 30 wt % to 100 wt %, and the softening point is 300° C. to 400° C.;

the microcrystal size $L_c$ in the c-axis direction, the microcrystal size $L_a$ in the a-axis direction and the interlayer spacing $d_{002}$ of the crystal plane (002) of the graphite obtained by XRD meet the following conditions:

$$L_c > 50 \text{ nm}, L_a > 80 \text{ nm}, d_{002} < 0.3358 \text{ nm}.$$

In the present invention, when using the above-mentioned method to prepare a highly thermally conductive heat storage material, in the preparation method of a highly thermally conductive heat storage material provided by the present invention, pre-molding at normal temperature allows the graphite to be pre-pressed into a layered stack with a high orientation degree and be more compact, which is conducive to improving the thermal conductivity and compressive strength; further, the molded sample formed by hot press molding can be subjected to heat treatment in batches, which can significantly reduce the process cost.

According to the present invention, based on the total weight of the highly thermally conductive heat storage material composition, the content of the graphite is 60 wt % to 75 wt %, and the content of the mesophase pitch is 25 wt % to 40 wt %.

In the preparation method of the present invention, the graphite and the mesophase pitch are as described in the second aspect of the present invention, and will not be further described in here.

In the present invention, in step (1), the graphite and mesophase pitch can be mixed uniformly at normal temperature by a mixing equipment.

According to the present invention, in step (2), the molding pressure of the pressing at normal temperature for pre-molding is 10 MPa to 40 MPa.

In the present invention, the premix is pre-pressed to be pre-molded at normal temperature and lower molding pressure as mentioned above, and pre-molding at normal temperature allows the graphite to be pre-pressed into a layered stack with a high orientation degree and be more compact, which is conducive to improving the thermal conductivity and compressive strength.

Furthermore, in step (2), the molding pressure of the pressing at normal temperature for pre-molding is 15 MPa to 30 MPa.

According to the present invention, in step (3), the conditions of the hot press molding include: a molding temperature of 400° C. to 600° C., and a molding pressure of 10 MPa to 100 MPa.

In the present invention, the pre-molded block is further subjected to hot press molding under the above-mentioned molding conditions, which can significantly reduce the content of residual volatiles in the molded sample, and thus allows the obtained highly thermally conductive heat storage material possesses high compressive strength, high thermal conductivity and high molding density.

Further preferably, the compression molding conditions include: a molding temperature of 450° C. to 550° C., and a molding pressure of 20 MPa to 60 MPa.

According to the present invention, in step (4), the conditions of said heat treatment include: a heat treatment temperature of 1600° C. to 3000° C., and a heat treatment time of 0.5 hour to 10 hours.

In the present invention, the molded sample is subjected to heat treatment under the above-mentioned conditions, which can further improve the graphitization degree of the mesophase pitch in the molded sample, and thus allows the obtained highly thermally conductive heat storage material possesses high compressive strength, high thermal conductivity and high molding density.

Further preferably, the conditions of the heat treatment include: a heat treatment temperature of 2400° C. to 3000° C., and a heat treatment time of 0.5 hour to 2 hours.

The fourth aspect of the present invention provides a highly thermally conductive heat storage material prepared by the above-mentioned preparation method.

The fifth aspect of the present invention provides the application of the above-mentioned highly thermally conductive heat storage material or the composition for preparing a highly thermally conductive heat storage material in the field of thermal storage and/or the field of heat conduction.

The present invention will be described in detail below by examples.

The bulk density of the highly thermally conductive heat storage material was determined according to method GB/T24528-2009.

The thermal conductivity of the highly thermally conductive heat storage material was determined according to method ASTM E1461.

The compressive strength of the highly thermally conductive heat storage material was determined according to method GBT1431-2019.

The degrees of graphitization of the carbonaceous part and the graphitic part are calculated through the interlayer spacing $d_{002}$ of the crystal plane (002) obtained by XRD analysis, specifically: the degree of graphitization $\lambda = (0.344 - d_{002}) \times 100\% / (0.344 - 0.3354)$;

The contents of the carbonaceous part and the graphitic part are calculated by the carbonization yield of the mesophase pitch part, specifically: for example, the content of the mesophase pitch in the premix composition is A, the heat treatment yield of the mesophase pitch is P.

The content of the carbonaceous part is M: $M = A \times P / [A \times P + (1-A)]$ The content of the graphitic part is N: $N = 1 - M$;

The softening point of the pitch is determined by GBT4507-2014 Standard test method for softening point of bitumen-Ring-and-ball apparatus;

the mesophase content of the mesophase pitch is determined by GBT 38396-2019 Pitch products of coal carbonization-Determination of mesophase content-Microscopical analysis by reflected light;

For mesophase pitch and graphite, the microcrystal size $L_c$ in the c-axis direction, the microcrystal size $L_a$ in the a-axis direction and the interlayer spacing $d_{002}$ of the crystal plane (002) are obtained by XRD.

The carbon content of the graphite is determined by GBT3521-2008 Method for chemical analysis of graphite.

The raw materials used in examples and comparative examples are commercially available.

Example 1

(1) 70 parts of graphite (the carbon content was 98 wt %, $L_c$ was 66 nm, $L_a$ was 108 nm, and $d_{002}$ was 0.3357 nm) and 30 parts of mesophase pitch ($L_c$ was 4.17 nm, $L_a$ was 15.3 nm, $d_{002}$ was 0.3475 nm, the mesophase content was 100 wt % and the softening point was 360° C.) were uniformly mixed, and a premix was obtained;

(2) the premix was pressed at normal temperature to be pre-molded, and a pre-molded block was obtained;

(3) the pre-molded block was hot press molded at a temperature of 500° C. and a pressure of 75 MPa, and a molded sample was obtained;

(4) in an argon atmosphere, the molded sample was subjected to heat treatment at 3000° C. for 1 hour, and the highly thermally conductive heat storage material A1 was obtained; the structure and performance of the highly thermally conductive heat storage material A1 were tested, and the test results can be seen in Table 1 and Table 2.

The polarized optical microscope photo of the mesophase pitch was shown in FIG. 1. The white light part in FIG. 1 was the morphology of the mesophase of the mesophase pitch. It can be seen from FIG. 1 that the mesophase content of the mesophase pitch is 100 wt %.

Example 2

A highly thermally conductive heat storage material was prepared according to the method of example 1 and the differences were as follows: the amount of the graphite was 60 parts, and the amount of the mesophase pitch was 40 parts. The highly thermally conductive heat storage material A2 was obtained. The structure and performance of the highly thermally conductive heat storage material A2 were tested, and the test results can be seen in Table 1 and Table 2.

Example 3

A highly thermally conductive heat storage material was prepared according to the method of example 1 and the differences were as follows: a mesophase pitch with $L_c$ of 2.1 nm, $L_a$ of 18.58 nm, $d_{002}$ of 0.3558 nm, mesophase content of 40 wt % and a softening point of 320° C. was used to replace the mesophase pitch used in example 1. The highly thermally conductive heat storage material A3 was obtained. The structure and performance of the highly thermally conductive heat storage material A3 were tested, and the test results can be seen in Table 1 and Table 2.

Example 4

A highly thermally conductive heat storage material was prepared according to the method of example 1 and the differences were as follows: a graphite with a carbon content of 99.9 wt %, $L_c$ of 72 nm, $L_a$ of 119 nm, $d_{002}$ of 0.3356 nm was used to replace the graphite used in example 1. The highly thermally conductive heat storage material A4 was obtained. The structure and performance of the highly thermally conductive heat storage material A4 were tested, and the test results can be seen in Table 1 and Table 2.

Example 5

A highly thermally conductive heat storage material was prepared according to the method of example 4 and the differences were as follows: the amount of the graphite was 80 parts, and the amount of the mesophase pitch was 20 parts. The highly thermally conductive heat storage material A5 was obtained. The structure and performance of the highly thermally conductive heat storage material A5 were tested, and the test results can be seen in Table 1 and Table 2.

Comparative Example 1

A highly thermally conductive heat storage material was prepared according to the method of example 1 and the differences were as follows: an isotropic pitch with a mesophase content of 0 wt % and a softening point of 260° C. was used to replace the mesophase pitch used in example 1. The heat storage material D1 was obtained. The structure and performance of the heat storage material D1 were tested, and the test results can be seen in Table 1 and Table 2.

Comparative Example 2

A highly thermally conductive heat storage material was prepared according to the method of example 1 and the differences were as follows: a coal liquefaction pitch (C/H of the coal liquefaction pitch was 1.43, the softening point was 187° C. and the residual carbon rate after carbonization was 78%) was used to replace the mesophase pitch. The heat storage material D2 was obtained. The structure and performance of the heat storage material D2 were tested, and the test results can be seen in Table 1 and Table 2.

Comparative Example 3

A highly thermally conductive heat storage material was prepared according to the method of example 1 and the differences were as follows: a mesophase pitch with a softening point of 270° C. and a mesophase content of 10 wt % was used to replace the mesophase pitch used in example 1. The heat storage material D3 was obtained. The structure and performance of the heat storage material D3 were tested, and the test results can be seen in Table 1 and Table 2.

Comparative Example 4

A highly thermally conductive heat storage material was prepared according to the method of example 1 and the differences were as follows: a graphite with a carbon content of 94 wt %, $L_c$ of 47 nm, $L_a$ of 78 nm, $d_{002}$ of 0.3369 nm was used to replace the graphite used in example 1. The heat storage material D4 was obtained. The structure and performance of the heat storage material D4 were tested, and the test results can be seen in Table 1 and Table 2.

Comparative Example 5

A highly thermally conductive heat storage material was prepared according to the method of example 1 and the differences were as follows: the amount of the graphite was 45 parts, and the amount of the mesophase pitch was 55 parts. The heat storage material D5 was obtained. The structure and performance of the heat storage material D5 were tested, and the test results can be seen in Table 1 and Table 2.

TABLE 1

| Sample | Carbonaceous part | | | | | Graphitic part | | | | |
|---|---|---|---|---|---|---|---|---|---|---|
| | Content/wt % | $L_a$/nm | $L_c$/nm | $d_{002}$/nm | Degree of graphitization/% | Content/ wt % | $L_a$/nm | $L_c$/nm | $d_{002}$/nm | Degree of graphitization/% |
| A1 | 23 | 74 | 34 | 0.3361 | 91.86 | 77 | 108 | 66 | 0.3357 | 96.51 |
| A2 | 32 | 74 | 34 | 0.3361 | 91.86 | 68 | 108 | 66 | 0.3357 | 96.51 |
| A3 | 32 | 43 | 22 | 0.337 | 81.40 | 68 | 108 | 66 | 0.3357 | 96.51 |
| A4 | 23 | 74 | 34 | 0.3361 | 91.86 | 77 | 119 | 72 | 0.3356 | 97.67 |
| A5 | 15 | 74 | 34 | 0.3361 | 91.86 | 85 | 108 | 66 | 0.3357 | 96.51 |
| D1 | 23 | 11.25 | 1.68 | 0.352 | 93.02 | 77 | 108 | 66 | 0.3357 | 96.51 |
| D2 | 23 | 2.01 | 10.49 | 0.35 | 69.77 | 77 | 108 | 66 | 0.3357 | 96.51 |
| D3 | 23 | 32 | 16 | 0.34 | 46.51 | 77 | 108 | 66 | 0.3357 | 96.51 |
| D4 | 23 | 74 | 34 | 0.3361 | 91.86 | 77 | 78 | 47 | 0.3369 | 82.56 |
| D5 | 46 | 74 | 34 | 0.3361 | 91.86 | 54 | 108 | 66 | 0.3357 | 96.51 |

TABLE 2

| Sample | Compressive strength/ MPa | Thermal conductivity/ W/mK | Bulk density/ g/cm³ | Ratio of the thermal conductivity to the compressive strength W/(m · k · MPa) |
|---|---|---|---|---|
| A1 | 39 | 680 | 2.07 | 17.4 |
| A2 | 35 | 625 | 1.97 | 17.9 |
| A3 | 32 | 520 | 1.95 | 16.3 |
| A4 | 38 | 700 | 2.09 | 18.4 |
| A5 | 44 | 720 | 2.15 | 16.4 |
| D1 | 32 | 197 | 1.88 | 6.2 |
| D2 | 30 | 187 | 1.85 | 6.2 |
| D3 | 32 | 192 | 1.89 | 6 |
| D4 | 25 | 100 | 1.77 | 4 |
| D5 | 18 | 109 | 1.21 | 6.1 |

It can be seen from the results in table 1 and table 2 that the heat storage material prepared by the method provided in the present invention has advantages of high thermal conductivity, high strength, high ratio of the thermal conductivity to the compressive strength and high degree of graphitization, and can be use in middle-end and high-end fields in heat storage and heat conduction.

The above content specifies the preferred embodiments of the present invention, but the present invention is not limited thereto. A variety of simple modifications can be made in regard to the technical solutions of the present invention within the scope of the technical concept of the invention, including a combination of individual technical features in any other suitable manner, such simple modifications and combinations thereof shall also be regarded as the content disclosed by the present invention, each of them falls into the protection scope of the invention.

The invention claimed is:

1. A highly thermally conductive heat storage material, characterized in that, the highly thermally conductive heat storage material comprises a carbonaceous part and a graphitic part;

wherein, based on the total weight of the highly thermally conductive heat storage material, the carbonaceous part is present in an amount of 11 wt % to 41 wt %, and the graphitic part is present in an amount of 59 wt % to 89 wt %;

wherein the carbonaceous part has a microcrystal size Lc in a c-axis direction obtained by XRD of greater than 18 nm, a microcrystal size La in an a-axis direction of greater than 35 nm, an interlayer spacing $d_{002}$ of the crystal plane (002) of less than is 0.3388 nm, and a degree of graphitization of 60% to 95%;

wherein the graphitic part has a microcrystal size Lc in a c-axis direction obtained by XRD of greater than 50 nm, a microcrystal size La in an a-axis direction of greater than 80 nm, an interlayer spacing $d_{002}$ of the crystal plane (002) of less than 0.3358 nm, and a degree of graphitization of 95% to 100%.

2. The highly thermally conductive heat storage material according to claim 1, wherein the highly thermally conductive heat storage material has a bulk density of 1.9 g/cm³ to 2.18 g/cm³ is 1.9 g/cm³, a thermal conductivity of 500 W/mk to 800W/mk, a compressive strength of 29 MPa to 48 MPa, a ratio of the thermal conductivity to the compressive strength is 12 W/(m·k·MPa) to 25 W/(m·k·MPa).

3. A composition for preparing a highly thermally conductive heat storage material, characterized in that, the composition comprises a graphite and a mesophase pitch;

based on the total weight of the highly thermally conductive heat storage material composition, the graphite is present in an amount of 50 wt % to 85 wt %, and the mesophase pitch is present in an amount of 15 wt % to 50 wt %;

wherein the mesophase pitch has a microcrystal size Lc in a c-axis direction, a microcrystal size La in an a-axis direction and an interlayer spacing $d_{002}$ of the crystal plane (002) obtained by XRD meet the following conditions:

Lc>2 nm, La>12 nm, $d_{002}$<0.3580 nm;

wherein the mesophase pitch has a mesophase content of 30 wt % to 100 wt %, and a softening point of 300° C. to 400° C.;

wherein the graphite has a microcrystal size Lc in a c-axis direction, a microcrystal size La in an a-axis direction and an interlayer spacing $d_{002}$ of the crystal plane (002) obtained by XRD meet the following conditions:

Lc>50 nm, La>80 nm, $d_{002}$<0.3358 nm.

4. The composition according to claim 3, wherein, the graphite is at least one selected from the group consisting of natural flake graphite, artificial graphite and spherical graphite.

5. The composition according to claim 3, wherein, the graphite has a carbon content of greater than 95 wt %.

6. The composition according to claim 3, wherein, based on the total weight of the highly thermally conductive heat storage material composition, the graphite is present in an amount of 60 wt % to 75 wt %, and the mesophase pitch is present in an amount of 25 wt % to 40 wt %.

7. The composition according to claim 5, wherein, the graphite has a carbon content of greater than 98 wt %.

8. The composition according to claim 4, wherein, the graphite has a carbon content of greater than is 95 wt %.

9. A preparation method of a highly thermally conductive heat storage material, wherein, the preparation method comprises the following steps:

(1) uniformly mixing components of the highly thermally conductive heat storage material composition to obtain a premix;

(2) pressing the premix for pre-molding to obtain a pre-molded block;

(3) subjecting the pre-molded block to hot press molding to obtain a molded sample;

(4) subjecting the molded sample to heat treatment in an inert atmosphere to obtain the highly thermally conductive heat storage material;

wherein, the composition comprises a graphite and a mesophase pitch;

based on the total weight of the highly thermally conductive heat storage material composition, the graphite is present in an amount of 50 wt % to 85 wt %, and the mesophase pitch is present in an amount of 15 wt % to 50 wt %;

wherein the mesophase pitch has a microcrystal size $L_c$ in a c-axis direction, a microcrystal size $L_a$ in an a-axis direction and an interlayer spacing $d_{002}$ of the crystal plane (002) of obtained by XRD that meet the following conditions:

$L_c$>2 nm, $L_a$>12 nm, $d_{002}$<0.3580 nm;

wherein the mesophase pitch has a mesophase content of 30wt % to 100 wt %, and a softening point of 300° C. to 400° C.;

wherein the graphite has a microcrystal size $L_c$ in a c-axis direction, a microcrystal size $L_a$ in an a-axis direction and an interlayer spacing $d_{002}$ of the crystal plane (002) obtained by XRD that meet the following conditions:

$L_c$>50 nm, $L_a$>80 nm, $d_{002}$<0.3358 nm.

10. The preparation method according to claim 9, wherein, the graphite is at least one selected from the group consisting of natural flake graphite, artificial graphite and spherical graphite.

11. The preparation method according to claim 9, wherein, the graphite has a carbon content of greater than 95 wt %.

12. The preparation method according to claim 9, wherein, based on the total weight of the highly thermally conductive heat storage material composition, the graphite is present in an amount of 60 wt % to 75 wt %, and the mesophase pitch is present in an amount of 25 wt % to 40 wt %.

13. The preparation method according to claim 11, wherein, in step (2), the premix is pressed at a molding pressure of 10 MPa to 40 MPa.

14. The preparation method according to claim 11, wherein, in step (3), the hot press molding is conducted at a molding temperature of 400° C. to 600° C., and a molding pressure of 10 MPa to 100 MPa.

15. The preparation method according to claim 11, wherein, in step (4), the heat treatment is conducted at a heat treatment temperature of 1600° C. to 3000° C.; and a heat treatment time of 0.5 hour to 10 hours.

16. The preparation method according to claim 11, wherein, the graphite has a carbon content of greater than is 98 wt %.

17. The preparation method according to claim 15, wherein, in step (4), the heat treatment is conducted at a heat treatment temperature of 2400° C. to 3000° C.; and a heat treatment time of 0.5 hour to 2 hours.

\* \* \* \* \*